March 16, 1926.
B. A. KINSEY
1,576,978
STOVE
Filed March 20, 1925   2 Sheets-Sheet 1
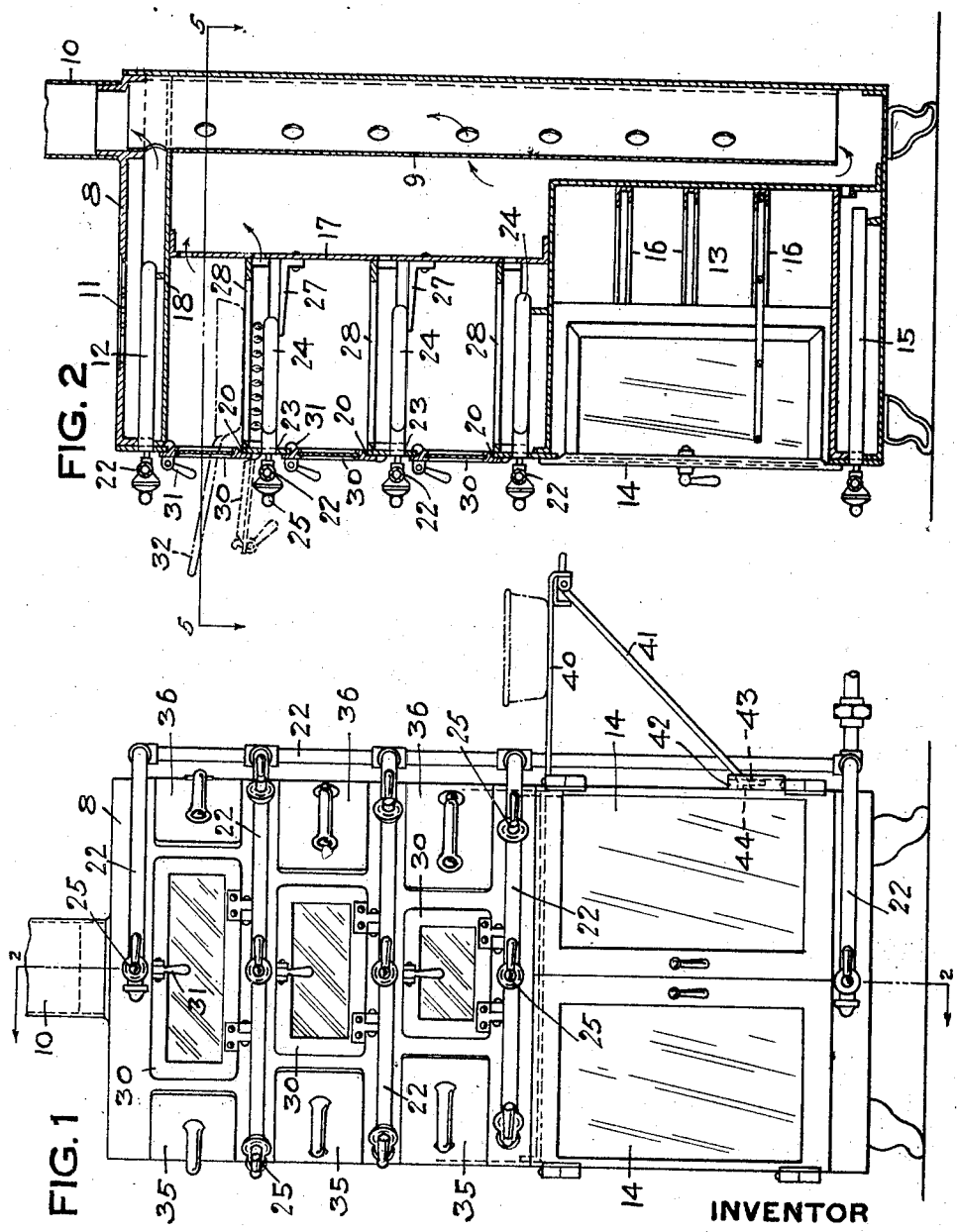
INVENTOR
Bert A. Kinsey
By Kay, Totten & Martin,
Attorneys.

March 16, 1926.

B. A. KINSEY

STOVE

Filed March 20, 1925    2 Sheets-Sheet 2

1,576,978

INVENTOR
Bert A. Kinsey
By Kay, Totten & Martin,
Attorneys

Patented Mar. 16, 1926.

1,576,978

UNITED STATES PATENT OFFICE.

BERT A. KINSEY, OF GLENSHAW, PENNSYLVANIA.

STOVE.

Application filed March 20, 1925. Serial No. 16,974.

*To all whom it may concern:*

Be it known that I, BERT A. KINSEY, a citizen of the United States, and resident of Glenshaw, in the county of Allegheny and State of Pennsylvania, have invented a new and useful Improvement in Stoves; and I do hereby declare the following to be a full, clear, and exact description thereof.

My invention relates to stoves, and particularly to cooking stoves that employ gas or similar fuel.

One object of my invention is to provide a cooking stove of such form that a maximum amount of cooking capacity is provided in a stove occupying a limited area, as in the corner of a room or an offset in the wall of a room, etc.

Another object of my invention is to provide a stove wherein the cooking vessels may form a part of the stove structure, thus eliminating the necessity of various pots and pans and cupboards for storing them.

Another object of my invention is to provide a stove of such form that lids or covers are not required for the cooking vessels.

A further object of my invention is to provide a stove of such form that the maximum efficiency is obtained from the fuel consumed.

A still further object of my invention is to simplify and improve generally the structure and operation of stoves.

Figure 3:
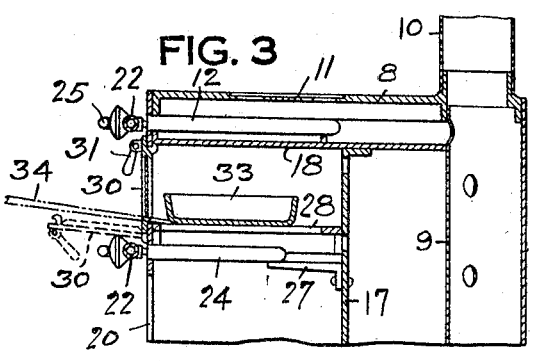
Figure 4:
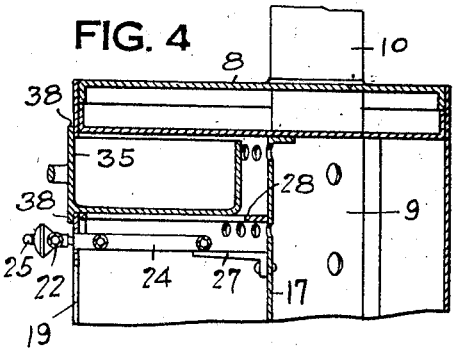
Figure 5:
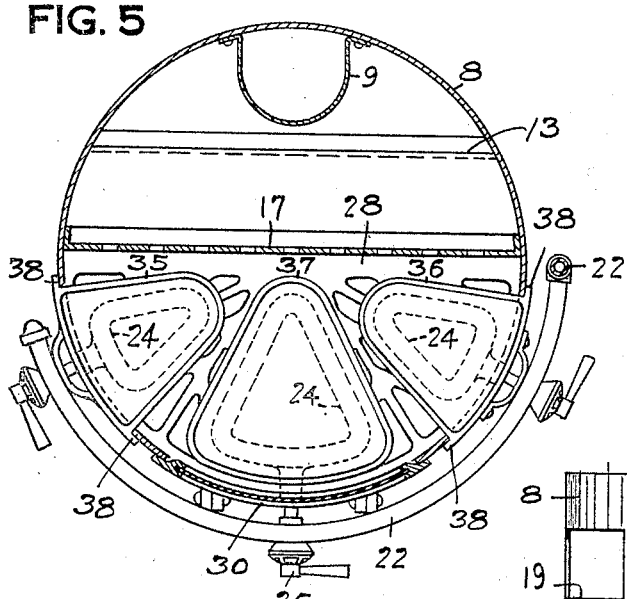
Figure 7:
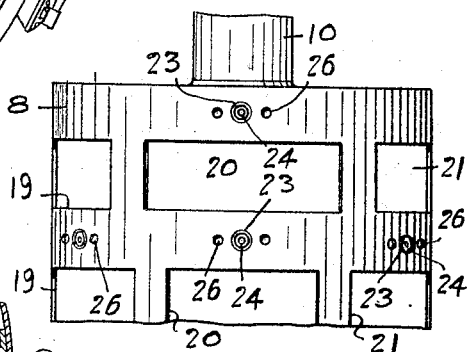
Figure 6:
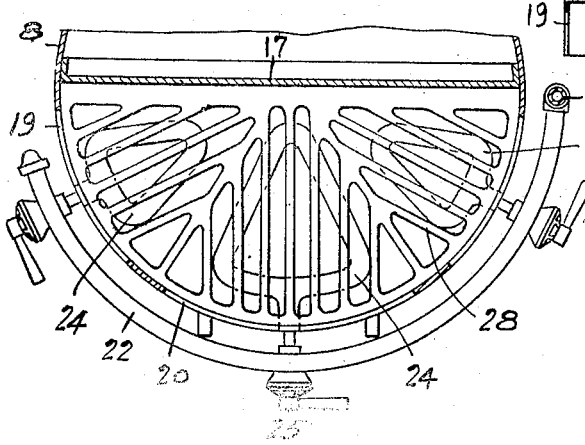

One form which my invention may take is shown in the accompanying drawing, wherein Fig. 1 is a front elevational view of a stove embodying my invention; Fig. 2 is a view taken on the line 2—2 of Fig. 1; Fig. 3 is a view of a portion of the apparatus of Fig. 1, showing one manner in which it may be used; Fig. 4 is a view similar to Fig. 3 but showing a vertical section through a different portion of the apparatus; Fig. 5 is a view taken on the line 5—5 of Fig. 2; Fig. 6 is a horizontal sectional view on a plane different than that of Fig. 5, and Fig. 7 is a front elevational view of a portion of the apparatus of Fig. 1, with certain of the parts removed.

The stove comprises a casing or body portion 8 to which is secured a flue member 9 as shown more clearly in Fig. 5. The member 9 is provided with a series of vertically spaced perforations and is open at its bottom. At its top it communicates with an ordinary stove pipe 10. The casing 8 is provided with a burner opening 11 at the top, upon which vessels too large to be placed within the compartments hereinafter referred to may be set, a gas burner 12 being provided therebeneath.

The casing 8 is provided with an oven compartment 13 that has doors 14 and beneath which a burner 15 is placed. The oven compartment has the usual shelf-supporting brackets 16. The oven chamber 13 may extend rearwardly nearly to the flue 9 as shown in Fig. 5.

Upon the oven I mount a perforated partition plate 17 that is preferably disposed on the diametral line of the casing 8. The upper end of the partition 17 is secured to a horizontally disposed partition plate 18.

In the semi-circular portion of the chamber 8 which is disposed to the front of the partition 17 I provide, as shown in Fig. 7, a plurality of openings 19, 20 and 21 for the reception of cooking vessels. Fuel supply pipes 22 lead to the oven burner 12 and, through openings 23 in the front wall of the casing 8, to burners 24. The fuel supply pipes to the burners are controlled by valves 25 which may be of the usual form. Air for assisting in combustion of the gas is permitted to enter the casing 8 through openings 26 which are shown more clearly in Fig. 7. A burner 24 is disposed adjacent to each of the openings 19, 20 and 21 in planes below the openings. The burners are supported at their rear sides by brackets 27 which are riveted or otherwise secured to the partition 17, and at their front sides are supported by the gas connections.

Above each horizontal series of burners 24 I mount a grid 28, as shown more clearly in Figs. 2 and 6 that may rest upon the burner brackets 27 or be secured to the partition 17 and the front wall of the stove, as desired. These grids serve as supports for the cooking vessels. The vertically aligned openings 21 are preferably provided with hinged doors 30 that have latching handles 31 and also glass panels through which the contents of a pan or other cooking vessel may be observed. The pans or skillets which are inserted through the openings 20 may have handles as shown by the skillets 32 in Fig. 2, in which case the door would have to remain open while the skillet is in the stove; or the vessel may be such as shown at 33 in Fig. 3, and may be inserted and removed by use of a peel or a paddle 34. In this latter case the door 30 can be closed while food is cooking in the pan 33.

The two series of verticaly aligned openings 19 and 21 permit of the insertion of cooking vessels 35 and 36 which are preferably of sector-like form as shown more clearly in Fig. 5.

The middle tier of vessels that are inserted through the openings 30 may also be of sector form as shown at 37 (Fig. 5). The burners 24 are preferably made triangular or sector-like, to conform somewhat to the shape of the cooking vessels.

The vessels 35 and 36 constitute in effect a portion of the stove since they are flanged at their front ends, as indicated in Fig. 4 at 38, and thereby serve as closure members for the openings 19 and 21. When the cooking vessels 35 and 36 are all in place the stove will have the appearance shown in Fig. 1.

While a burner 24 is provided for each cooking vessel, it will be seen that by reason of the presence of the partition 17 there may be sufficient heat from one or two burners in the compartment between the partition 17 and the front of the stove to not only cook articles placed above said burners but to cook articles contained in other portions of the compartment that do not require a great amount of heat. The various perforations heretofore referred to provide for exit of burnt gases, as indicated by the arrows. The perforations are preferably of such size that they retard somewhat the flow of burnt gases so that some of such gases will be drawn into the lower open end of the flue 9, as indicated by the arrows. This arrangement not only prevents excessive loss of heat but the oven 13 may be utilized to keep food warm without lighting its burner 15, since the burnt gases conducted past it to the lower end of the flue 9 will heat the same.

A shelf 40 is provided as shown in Fig. 1, such shelf being supported at its outer edge by a pivoted strut 41 whose lower end rests in a bracket 42. The strut 41 is supported at its lower end against vertical movement by a lug 43 that rests upon a lug 44 secured to the side of the stove. If the lower end of the strut 41 be pulled outward, the shelf 40 may then be slid into a horizontal recess above the oven 13, the lower end of the strut 14 being permitted to move downwardly so as not to interfere with such horizontal movement of the shelf 40.

Referring to Fig. 1, it will be seen that the topmost opening 20, that is closed by the door 30, is wider than the openings thereeneath and that the upper vessels 35 and 36 are narrower than the vessels below them. This arrangement permits of the economical employment of frying pans of various sizes in the middle row of compartments, and by varying the width of the vessels 35 and 36 to correspond to the various widths of the frying pan compartments, cooking vessels of various sizes may be used and all of the available space nevertheless utilized.

It will be understood that the stove need not be circular in cross section, but may be polygonal, or the rear side may be flattened and its front portion arcuate. Likewise, the arrangement of the cooking vessels and compartments may be varied. For instance, instead of having three vessels in each horizontal plane, provision may be made for supporting but two vessels in each plane. The vessels may be of other than sector form, if desired, although I prefer such form so as to economize in space.

Also, while I have indicated gas as the fuel to be employed, it will be apparent that heat may be had from other sources, as oil, electricity, etc.

I claim as my invention:

1. A stove comprising a casing, a diametrally disposed partition in said casing, openings provided in the casing wall of the front of said partition, for the reception of cooking vessels, a plurality of vertically aligned burners in the space between said partition and said wall, vent openings in said partition, and a flue opening at the rear of said casing with which said vents communicate.

2. A stove comprising a casing of generally cylindrical form, adapted to be mounted in upright position, a partition in said casing adjacent to the rear side thereof, a horizontal wall extending from a point at the front of the said casing to said partition, to form an oven in said casing, a diametrally disposed partition mounted above said wall and extending substantially to the top of the casing, and a plurality of vertically aligned burners mounted in the compartment formed between said last-named partition and the front of the casing, the front of the casing being provided with openings leading into said oven and said last-named compartment.

3. A stove comprising a casing of general cylindrical form, adapted to be mounted in upright position, a partition in said casing adjacent to the rear side thereof, a horizontal wall extending from a point at the front of said casing to said partition, to form an oven in said casing, a diametrally disposed partition mounted above said horizontal wall and extending substantially to the top of the casing, a plurality of vertically aligned burners mounted in the compartment formed between said last-named partition and the front of the casing, the front of the casing being provided with openings leading into said oven and said last-named compartment, a vertically disposed flue adjacent to the rear side of said oven and compartment and open at its lower end, said oven and compartment being provided with perforations to permit escape of burnt gas to said flue.

4. A stove comprising a casing of generally cylindrical form adapted to be mounted in upright position, a vertical partition in said casing, a plurality of vertically aligned cooking receptacles disposed to the front of said partition and removable through the front wall of the stove, a flue connected to the compartment formed at the rear side of said partition, and burners for heating the compartment to the front of said partition, the said partition being provided with vent openings at points adjacent to each of said receptacles.

5. A stove comprising a casing of generally cylindrical form adapted to be mounted in upright position, a vertical partition in said casing a plurality of vertically aligned cooking receptacles disposed to the front of said partition and removable through the wall of the stove, a flue connected to the compartment formed at the rear side of said partition, and means for heating the compartment to the front of said partition, the said partition being provided with vent openings that afford communication between the said compartment and said flue.

In testimony whereof I, the said BERT A. KINSEY, have hereunto set my hand.

BERT A. KINSEY.